(12) United States Patent
Liu

(10) Patent No.: US 6,914,980 B2
(45) Date of Patent: Jul. 5, 2005

(54) POWER SWITCH DEVICE UTILIZING PHONE LOOP SIGNALS TO CONTROL SUPPLY OF ELECTRICAL POWER TO A TELEPHONY INSTRUMENT

(76) Inventor: Chung-Kun Liu, No. 25, Ching-Cheng 10th St., Taichung City (TW)

(*) Notice: Subject to any disclaimer, the term of this patent is extended or adjusted under 35 U.S.C. 154(b) by 502 days.

(21) Appl. No.: 10/040,845

(22) Filed: Jan. 7, 2002

(65) Prior Publication Data

US 2003/0128837 A1 Jul. 10, 2003

(51) Int. Cl.⁷ .............................................. H04M 19/08
(52) U.S. Cl. .............................. 379/395.01; 379/413.01
(58) Field of Search ........................... 379/413, 395.07, 379/377, 378

(56) References Cited

U.S. PATENT DOCUMENTS 4,636,587 A * 1/1987 Zoerner ...................... 379/377

* cited by examiner

Primary Examiner—Sinh Tran
Assistant Examiner—Walter F Briney, III
(74) Attorney, Agent, or Firm—Brooks Kushman P.C.

(57) ABSTRACT

A power switch device is used with a telephony instrument that is connected to a local phone loop via two telephone wires and that has two power lines for connection to a power source. The device includes a rectifier connected to the telephone wires, and a latching relay having an exciting coil connected to the rectifier via a differentiator, and a switch unit. The coil is excited by current flowing through the differentiator when a ring signal is present at the telephone wires so as to enable the switch unit to make connection between the power lines and the power source. An integrator is connected between the rectifier and the coil, and discharges when neither the ring signal nor a talking signal is present at the telephone wires so as to excite the coil and enable the switch unit to break connection between the power lines and the power source.

7 Claims, 3 Drawing Sheets

POWER SWITCH DEVICE UTILIZING PHONE LOOP SIGNALS TO CONTROL SUPPLY OF ELECTRICAL POWER TO A TELEPHONY INSTRUMENT

BACKGROUND OF THE INVENTION

1. Field of the Invention

The invention relates to a telephone accessory, more particularly to a power switch device that utilizes phone loop signals to control the supply of electrical power to a telephony instrument.

2. Description of the Related Art

Most conventional telephony instruments, such as facsimile machines, telephone answering machines, and wireless telephone sets, are configured to draw electrical power continuously from a power source, and thus consume electrical power even when in an on-hook or waiting state. FIGS. 4 and 5 illustrate two conventional schemes for reducing electrical power consumption of a telephony instrument. In FIG. 4, the telephony instrument 703 is connected to a local phone loop via a pair of telephone wires (A, B), and is further connected to an AC power source (not shown) via a pair of power lines (C, D). A power switch 701 is connected to the telephone wires (A, B), and is further connected to the AC power source. The power switch 701 makes or breaks connection between the power source and the power line (C) in accordance with phone loop signals at the telephone wires (A, B). In FIG. 5, the telephony instrument 703 is connected to the local phone loop via a pair of telephone wires (A, B), and is further connected to a solar cell 704. A power switch 702 is connected to the telephone wires (A, B), and is further connected to an AC power source (not shown) via power lines (E, F). Similar to the circuit of FIG. 4, the power switch 702 makes or breaks connection between the telephony instrument 703 and the solar cell 704 in accordance with phone loop signals at the telephone wires (A, B). Because the telephony instrument 703 is normally disconnected from the AC power source or the solar cell 704 when in the on-hook or waiting state, electrical power consumption can be reduced. However, because the power switches 701, 702 require connection to the AC power source, the aforesaid schemes cannot be relied upon to ensure operation of the telephony instrument 703 in the event of power failure.

In order to ensure operability of telephony instruments in the event of power failure, it has been proposed heretofore to connect the aforesaid power switches 701, 702 to an uninterruptible power supply. However, use of the uninterruptible power supply results in added expense to consumers.

SUMMARY OF THE INVENTION

Therefore, the main object of the present invention is to provide a power switch device that utilizes phone loop signals to control the supply of electrical power to a telephony instrument and that permits operation of the telephony instrument even in the event of power failure.

According to the present invention, a power switch device is adapted for use with a telephony instrument that is connected to a local phone loop via a pair of telephone wires and that has a pair of power lines for connection to a power source. The power switch device comprises:

a rectifier adapted to be connected to the telephone wires and to process a phone look signal present at the telephone wires for generating a positive output;

a latching relay including an exciting coil and a switch unit adapted to interconnect one of the power lines to the power source;

a differentiator interconnecting the rectifier and the exciting coil of the latching relay, the exciting coil of the latching relay being excited by electric current flowing through the differentiator so as to enable the switch unit to make connection between said one of the power lines and the power source in order to enable operation of the telephony instrument when the phone loop signal present at the telephone wires is a ring signal;

an integrator connected between the rectifier and the exciting coil of the latching relay; and a discharge control circuit connected to the differentiator and the integrator, the discharge control circuit inhibiting the integrator from discharging electric current when the phone loop signal present at the telephone wires is the ring signal, and allowing the integrator to discharge when the phone loop signal present at the telephone wires is neither the ring signal nor a talking signal, the exciting coil of the latching relay being excited by the electric current discharged by the integrator so as to enable the switch unit to break connection between said one of the power lines and the power source, thereby disabling operation of the telephony instrument.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
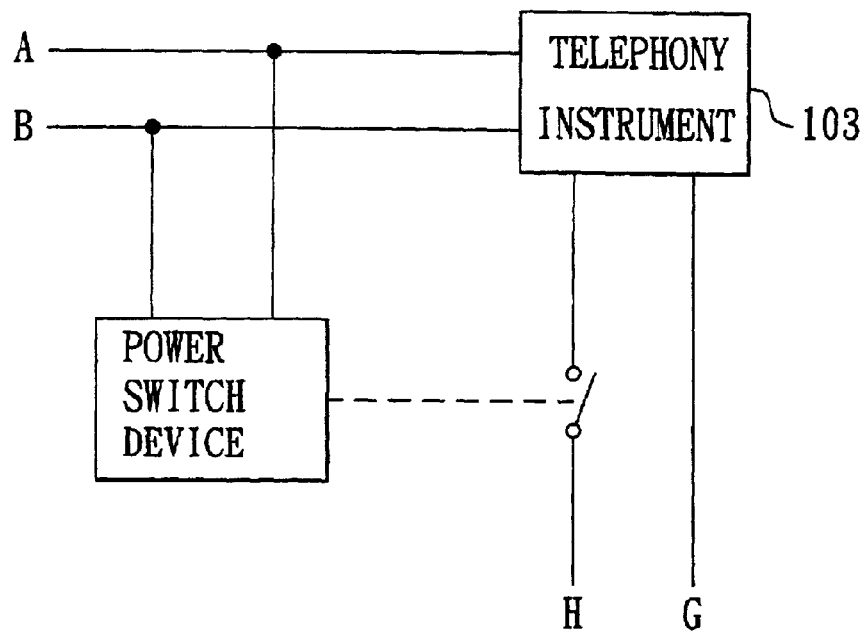
FIGS. 1 and 2 are schematic circuit block diagrams illustrating the preferred embodiment of a power switch device according to the present invention when applied to a telephony instrument.
Figure 2:
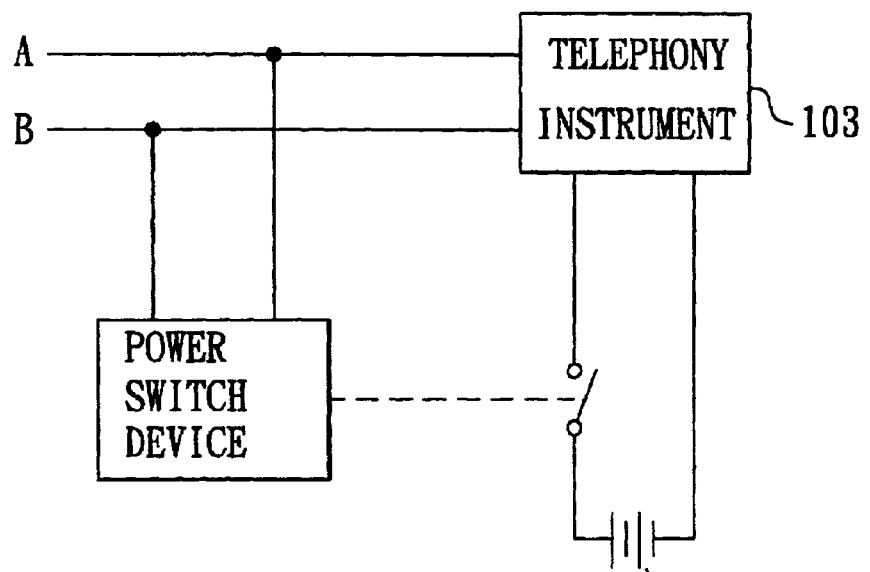

Referring to FIG. 1, the preferred embodiment of a power switch device according to the present invention is adapted for use with a telephony instrument 103, such as facsimile machines, telephone answering machines, wireless telephone sets, home automation servers and office automation servers. The telephony instrument 103 is connected to a local phone loop via a pair of telephone wires (A, B), and is further connected to a power source via power lines (G, H) The power source may be an AC power source or a DC power source 105, such as a solar cell, as best shown in FIG. 2.

Figure 3:
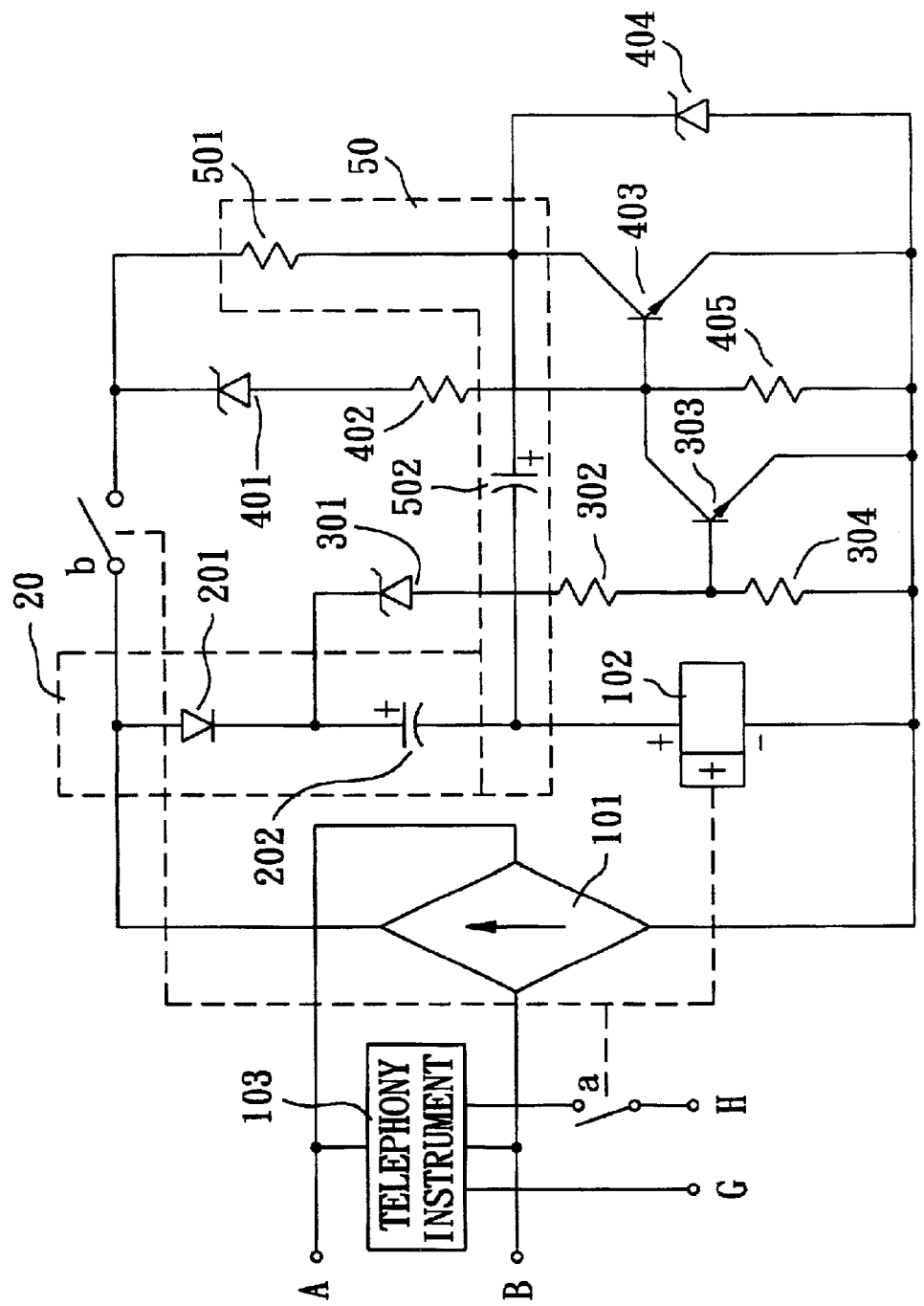
FIG. 3 is a schematic electrical circuit diagram of the preferred embodiment.
Figure 4:
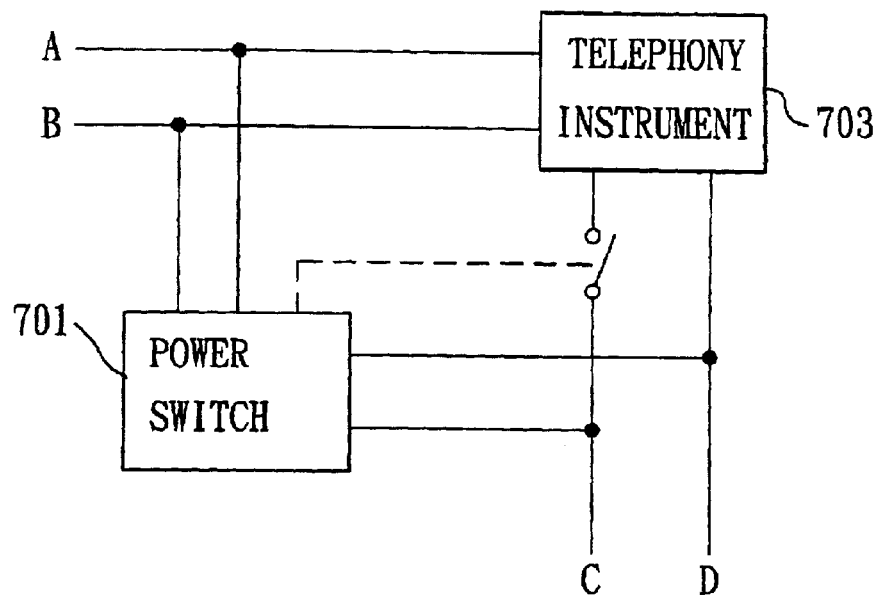
FIGS. 4 and 5 are schematic circuit block diagrams illustrating two conventional schemes for reducing electrical power consumption of a telephony instrument.
Figure 5:
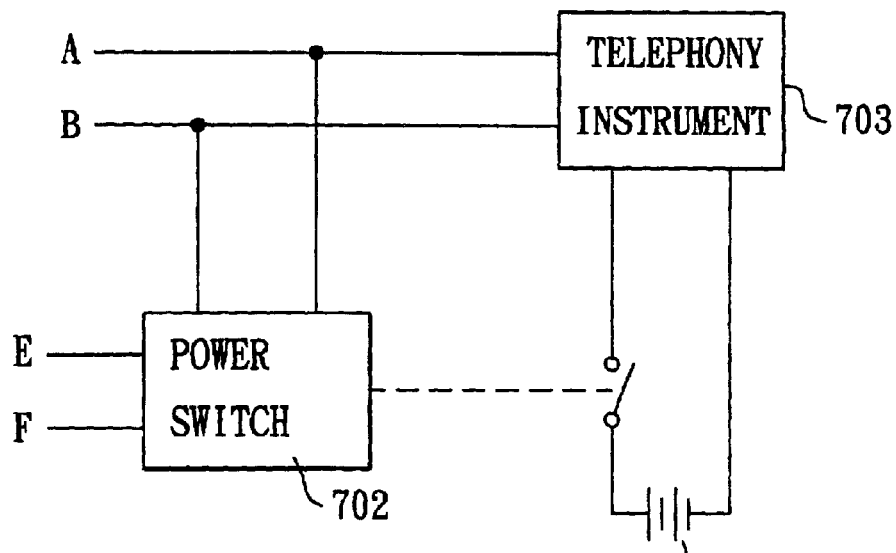

With further reference to FIG. 3, the power switch device is adapted to make or break connection between the telephony instrument 103 and the power source in accordance with the phone loop signal present at the telephone wires (A, B). The power switch device generally comprises a rectifier 101, a latching relay with an exciting coil 102, a differentiator 20, and an integrator 50.

In this embodiment, the rectifier 101 is a bridge rectifier that is adapted to be connected to the telephone wires (A, B). The rectifier 101 processes the phone loop signal at the telephone wires (A, B) for generating a DC output.

The differentiator 20 connects a positive output terminal of the rectifier 101 to the exciting coil 102 of the latching relay, and includes a series connection of a diode 201 and a capacitor 202. Particularly, the diode 201 has an anode connected to the positive output terminal of the rectifier 101, and a cathode connected to a positive terminal of the capacitor 202. The capacitor 202 has a negative terminal connected to a positive terminal of the exciting coil 102. The exciting coil 102 has a negative terminal connected to a negative output terminal of the rectifier 101. The capacitor 202 is charged by the DC output from the rectifier 101 and thus controls the flow of exciting current to the exciting coil 102 of the latching relay when the phone loop signal present at the telephone wires (A, B) is a ring signal.

In this embodiment, the latching relay is a double-pole single-throw or double-throw latching relay switch. Aside from the exciting coil 102, the latching relay further includes a first switch unit (a) for making and breaking connection between the power source and the power line (H), and a second switch unit (b) for making and breaking connection between the positive output terminal of the rectifier 101 and the integrator 50. Particularly, when the exciting coil 102 of the latching relay is excited by the exciting current flowing through the differentiator 20, the first switch unit (a) will be enabled to make connection between the power source and the power line (H), and the second switch unit (b) will be enabled to make connection between the rectifier 101 and the integrator 50.

The integrator 50 is connected to the positive output terminal of the rectifier 101 via the second switch unit (b), and is further connected to the exciting coil 102. In this embodiment, the integrator 50 includes a series connection of a resistor 501 and a capacitor 502. The resistor 501 has a first resistor terminal connected to the second switch unit (b), and a second resistor terminal connected to a positive terminal of the capacitor 502. The capacitor 502 has a negative terminal connected to the positive terminal of the exciting coil 102. The capacitor 502 is adapted to be charged when the phone loop signal present at the telephone wires (A, B) is a talking signal.

The power switch device further includes a discharge control circuit connected to the differentiator 20 and the integrator 50. The discharge control circuit inhibits the capacitor 502 of the integrator 50 from discharging electric current when the phone loop signal present at the telephone wires (A, B) is the ring signal, and allows the capacitor 502 of the integrator 50 to discharge when the phone loop signal present at the telephone wires (A, B) is neither the ring signal nor the talking signal. The exciting coil 102 of the latching relay is excited by the electric current discharged by the integrator 50 so as to enable the first switch unit (a) to break connection between the power source and the power line (H) and so as to enable the second switch unit (b) to break connection between the rectifier 101 and the integrator 50. In this embodiment, the discharge control circuit includes zener diodes 301, 401, 404, resistors 302, 304, 402, 405, and NPN transistors 303, 403.

The zener diode 301 has a cathode connected to a junction of the diode 201 and the capacitor 202 of the differentiator 20. The zener diode 301 further has an anode connected to a first resistor terminal of the resistor 302. A second resistor terminal of the resistor 302 and a first resistor terminal of the resistor 304 are connected to a base terminal of the transistor 303. A second resistor terminal of the resistor 304 and an emitter terminal of the transistor 303 are connected to the negative output terminal of the rectifier 101. The zener diode 401 has a cathode connected to the positive output terminal of the rectifier 101 via the second switch unit (b). The zener diode 401 further has an anode connected to a first resistor terminal of the resistor 402. The zener diode 401 may be replaced by a capacitor (not shown). A second resistor terminal of the resistor 402 and a first resistor terminal of the resistor 405 are connected to a collector terminal of the transistor 303. A second resistor terminal of the resistor 405 is connected to the negative output terminal of the rectifier 101. The transistor 403 has a collector terminal connected to a junction of the resistor 501 and the capacitor 502 of the integrator 50, a base terminal connected to the collector terminal of the transistor 303, and an emitter terminal connected to the negative output terminal of the rectifier 101. The zener diode 404 has a cathode connected to the collector terminal of the transistor 403, and an anode connected to the negative output terminal of the rectifier 101. The zener diode 404 is provided to protect the transistor 403 and the capacitor 502.

In use, when a ring signal is present at the telephone wires (A, B), the ring signal will be processed by the rectifier 101 to generate a high voltage rectified DC output. The DC output of the rectifier 101 will charge the capacitor 202 of the differentiator 20, and the charging current flowing through the capacitor 202 will also serve as the exciting current for the latching relay When the exciting coil 102 of the latching relay is excited by the exciting current, the first and second switch units (a, b) of the latching relay will close, thereby making connection between the power source and the power line (H) and between the integrator 50 and the rectifier 101. At this time, electric power is supplied to the telephony instrument 103 for enabling operation of the latter, and the transistor 403 of the discharge control circuit inhibits the capacitor 502 of the integrator 50 from discharging electric current.

Thereafter, when the telephony instrument 103 changes to an off-hook state, i.e. low DC voltage talking signals are present at the telephone wires (A, B), the discharge control circuit allows the capacitor 502 of the integrator 50 to charge. Finally, when the telephony instrument 103 changes to an on-hook state, i.e. neither the ring signal nor the talking signal is present at the telephone wires (A, B), the discharge control circuit will allow the capacitor 502 to discharge instantaneously. The electric current discharged by the integrator 50 will excite the exciting coil 102 of the latching relay, thereby causing the first and second switch units (a, b) of the latching relay to open so as to break connection between the power source and the power line (H) and between the integrator 50 and the rectifier 101. The telephony instrument 103 is disabled at this time.

It has thus been shown that the power switch device of the present invention utilizes phone loop signals to control the supply of electrical power to the telephony instrument 103 so as to reduce electrical power consumption of the latter. In addition, the power switch device does not require the presence of AC power during use. As such, operation of the telephony instrument 103 is possible even in the event of power failure.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A power switch device for a telephony instrument that is connected to a local phone loop via a pair of telephone wires and that has a pair of power lines for connection to a power source, said power switch device comprising:

a rectifier adapted to be connected to the telephone wires and to process a phone loop signal present at the telephone wires for generating a positive output;

a latching relay including an exciting coil and a first switch unit adapted to interconnect one of the power lines to the power source;

a differentiator interconnecting said rectifier and said exciting coil of said latching relay, said exciting coil of said latching relay being excited by electric current flowing through said differentiator so as to enable said first switch unit to make connection between said one of the power lines and the power source in order to enable operation of the telephony instrument when the phone loop signal present at the telephone wires is a ring signal;

an integrator connected between said rectifier and said exciting coil of said latching relay;

a discharge control circuit connected to said differentiator and said integrator, said discharge control circuit inhibiting said integrator from discharging electric current when the phone loop signal present at the telephone wires is the ring signal, and allowing said integrator to discharge when the phone loop signal present at the telephone wires is neither the ring signal nor a talking signal, said exciting coil of said latching relay being excited by the electric current discharged by said integrator so as to enable said first switch unit to break connection between said one of the power lines and the power source, thereby disabling operation of the telephone instrument; and said differentiator including a series connection of a diode and a capacitor, and said capacitor being charged by the positive output from said rectifier when the phone loop signal present at the telephone wires is the ring signal.

2. The power switch device as claimed in claim 1, wherein said rectifier is a bridge rectifier.

3. The power switch device as claimed in claim 1, wherein said integrator includes a series connection of a resistor and a capacitor, said discharge control circuit permitting charging of said capacitor when the phone loop signal present at the telephone wires is the talking signal.

4. A power switch device for a telephony instrument that is connected to a local phone loop via a pair of telephone wires and that has a pair of power lines for connection to a power source, said power switch device comprising:

a rectifier adapted to be connected to the telephone wires and to process a phone loop signal present at the telephone wires for generating a positive output;

a latching relay including an exciting coil and a first switch unit adapted to interconnect one of the power lines to the power source;

a differentiator interconnecting said rectifier and said exciting coil of said latching relay, said exciting coil of said latching relay being excited by electric current flowing through said differentiator so as to enable said first switch unit to make connection between said one of the power lines and the power source in order to enable operation of the telephony instrument when the phone loop signal present at the telephone wires is a ring signal;

an integrator connected between said rectifier and said exciting coil of said latching relay;

a discharge control circuit connected to said differentiator and said integrator, said discharge control circuit inhibiting said integrator from discharging electric current when the phone loop signal present at the telephone wires is the ring signal, and allowing said integrator to discharge when the phone loop signal present at the telephone wires is neither the ring signal nor a talking signal said exciting coil of said latching relay being excited by the electric current discharged by said integrator so as to enable said first switch unit to break connection between said one of the power lines and the power source, thereby disabling operation of the telephone instrument; and said latching relay further including a second switch unit that makes connection between said rectifier and said integrator when said exciting coil of said latching relay is excited by the electric current flowing through said differentiator, and that breaks connection between said rectifier and said integrator when said exciting coil of said latching relay is excited by the electric current discharged by said integrator.

5. The power switch device as claimed in claim 4, wherein said rectifier is a bridge rectifier.

6. The power switch device as claimed in claim 4, wherein said differentiator includes a series connection of a diode and a capacitor, said capacitor being charged by the positive output from said rectifier when the phone loop signal present at the telephone wires is the ring signal.

7. The power switch device as claimed in claim 4, wherein said integrator includes a series connection of a resistor and a capacitor, said discharge control circuit permitting charging of said capacitor when the phone loop signal present at the telephone wires is the talking signal.

* * * * *